US009556289B2

(12) United States Patent
Kwon et al.

(10) Patent No.: US 9,556,289 B2
(45) Date of Patent: Jan. 31, 2017

(54) SUPPORTED HYBRID CATALYST AND METHOD FOR PREPARING OLEFIN-BASED POLYMER USING THE SAME

(71) Applicant: LG CHEM, LTD., Seoul (KR)

(72) Inventors: Heon Yong Kwon, Daejeon (KR); Eun Young Shin, Daejeon (KR); Ki Soo Lee, Daejeon (KR); Dae Sik Hong, Daejeon (KR); Se Young Kim, Daejeon (KR); Sung Min Lee, Daejeon (KR); Hyun Jee Kwon, Daejeon (KR); Yong Ho Lee, Daejeon (KR); Yu Taek Sung, Daejeon (KR); Dong Hoon Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/911,448

(22) PCT Filed: Sep. 7, 2015

(86) PCT No.: PCT/KR2015/009418
§ 371 (c)(1),
(2) Date: Feb. 10, 2016

(87) PCT Pub. No.: WO2016/036221
PCT Pub. Date: Mar. 10, 2016

(65) Prior Publication Data
US 2016/0280813 A1 Sep. 29, 2016

(30) Foreign Application Priority Data

Sep. 5, 2014 (KR) .................... 10-2014-0119030
Sep. 7, 2015 (KR) .................... 10-2015-0126105

(51) Int. Cl.
C08F 210/16 (2006.01)
C08F 10/14 (2006.01)
C08F 10/00 (2006.01)
C08F 4/659 (2006.01)

(52) U.S. Cl.
CPC ............... *C08F 10/14* (2013.01); *C08F 10/00* (2013.01); *C08F 4/65912* (2013.01); *C08F 4/65916* (2013.01); *C08F 2420/02* (2013.01)

(58) Field of Classification Search
None
See application file for complete search history.

(56) References Cited

U.S. PATENT DOCUMENTS

| 4,935,474 A | 6/1990 | Ewen et al. |
| 5,914,289 A | 6/1999 | Razavi |
| 6,255,426 B1 | 7/2001 | Lue et al. |
| 6,329,541 B1 | 12/2001 | Jung et al. |
| 6,492,472 B2 | 12/2002 | Lue et al. |
| 6,828,394 B2 | 12/2004 | Vaughan et al. |
| 6,841,631 B2 | 1/2005 | Loveday et al. |
| 6,894,128 B2 | 5/2005 | Loveday et al. |
| 7,294,600 B2 | 11/2007 | Lee et al. |
| 7,666,959 B2 | 2/2010 | Razavi |
| 2013/0046068 A1* | 2/2013 | Kwon ............ C08F 10/00 526/90 |

FOREIGN PATENT DOCUMENTS

| JP | 10-204112 A | 8/1998 |
| JP | 2011-117006 A | 6/2011 |
| KR | 2001-0023862 A | 3/2001 |
| KR | 10-2004-0076965 A | 9/2004 |
| KR | 10-2004-0085650 A | 10/2004 |
| KR | 10-2005-0098663 A | 10/2005 |
| KR | 10-2006-0091528 A | 8/2006 |
| KR | 10-2008-0092340 A | 10/2008 |
| KR | 10-2010-0028317 A | 3/2010 |
| KR | 10-0964093 B1 | 6/2010 |
| KR | 10-1086603 B1 | 11/2011 |
| KR | 10-2014-0067410 A | 6/2014 |
| KR | 10-2015-0058054 A | 5/2015 |
| KR | 10-2015-0063885 A | 6/2015 |
| KR | 10-2015-0066484 A | 6/2015 |

OTHER PUBLICATIONS

Helmut G. Alt et al., "C1-verbrückte Fluorenyliden-Indenylidenkomplexe des Typs (C13H8-CR2-C9H6-nR'n)ZrCl2 (n=0, 1; R=Me, Ph, Butenyl; R'=Alkyl, Alkenyl) als Metallocenkatalysatorvorstufen für die Ethylenpolymerisation", Journal of Organometallic Chemistry, vol. 562, 1998, pp. 153-181.

Matthew D. Lococo et al., "Chelate-Controlled Synthesis of Racemic ansa-Zirconocenes", J. Am. Chem. Soc., 2004, vol. 126, pp. 15231-15244.

Ilya E Nifant'ev et al., "Synthesis of Zirconium and Hafnium ansa-Metallocenes via Transmetalation of Dielement-Substituted Bis(cyclopentadieny) and Bis(idenyl) Ligands", Organometallics, 1997, vol. 16, pp. 713-715.

Gabriela Nemes et al., "Silatropic Migration in (1-Trimethylsilylindenyl) (Indenyl) Dimethylsilane, Bis(1-Trimenthyl-Silylindenyl) Dimethylsilane and Related Compounds", Revue Roumaine de Chimie, 2007, vol. 52(8-9), pp. 809-816.

* cited by examiner

*Primary Examiner* — Yun Qian
(74) *Attorney, Agent, or Firm* — Dentons US LLP

(57) ABSTRACT

The present invention relates to a supported hybrid catalyst and a method for preparing an olefin based polymer using the same. The supported hybrid catalyst according to the present invention can be used in the preparation of an olefin-based polymer, and the olefin-based polymer prepared using the supported hybrid catalyst has excellent processability and mechanical properties and thus can be effectively used for the application of films or the like.

8 Claims, No Drawings

SUPPORTED HYBRID CATALYST AND METHOD FOR PREPARING OLEFIN-BASED POLYMER USING THE SAME

CROSS-REFERENCE TO RELATED APPLICATION(S)

This application is the National Phase Entry of PCT/KR2015/009418 filed on Sep 7, 2015 and claims the benefit of Korean Patent Application No. 10-2014-0119030 filed on Sep. 5, 2014 and Korean Patent Application No. 10-2015-0126105 filed on Sep. 7, 2015 with the Korean Intellectual Property Office, the disclosures of which are herein incorporated by reference in their entirety.

TECHNICAL FIELD

The present invention relates to a supported hybrid catalyst and a method for preparing an olefin-based polymer using the same.

BACKGROUND OF ART

Olefin polymerization catalyst systems can be classified into Ziegler-Natta and metallocene catalyst systems, and these two highly active catalyst systems have been developed in compliance with their characteristics. Ziegler-Natta catalyst have been widely applied to existing commercial processes since it was developed in the 1950's. However, since the Ziegler-Natta catalyst is a multi-active site catalyst in which a plurality of active sites are mixed, it has a feature that molecular weight distribution of the polymer is broad, and there is a problem in that since composition distribution of comonomers is not uniform, it is difficult to provide the desired physical properties.

Meanwhile, the metallocene catalyst comprises a main catalyst whose main component is a transition metal compound, and an organometallic compound cocatalyst whose main component is aluminium. Such a catalyst is a single-site catalyst which is a homogeneous complex catalyst, and offers a polymer having a narrow molecular weight distribution and an uniform composition distribution of comonomers, depending on the single site characteristics. The stereoregularity, copolymerizing properties, molecular weight, crystallinity and the like of the resulting polymer can be controlled by changing the ligand structure of the catalyst and the polymerization condition.

U.S. Pat. No. 5,914,289 discloses a method of controlling the molecular weight and the molecular weight distribution of polymers using metallocene catalysts which are supported on supports. A large amount of solvent and long time are required to prepare the supported catalysts, and the process of supporting metallocene catalysts on the respective support is troublesome.

Korean Patent Application No. 2003-12308 discloses a method of controlling the molecular weight distribution of polymers by polymerizing while changing a combination of catalysts in a reactor by supporting a bi-nuclear metallocene catalyst and a mononuclear metallocene catalyst on a support with an activator. However, this method is limited in simultaneous achievement of properties of the respective catalysts. In addition, there is a disadvantage that a metallocene catalyst portion is departed from a supported catalyst to cause fouling in the reactor.

Therefore, in order to solve the above-mentioned disadvantages, there is a need to develop a method for preparing olefin-based polymers with a desired physical properties by easily preparing a supported hybrid metallocene catalyst having an excellent activity.

On the other hand, a linear low density polyethylene is prepared by copolymerizing ethylene and alpha-olefins using a polymerization catalyst under a low pressure. Thus, this is a resin having a narrow molecular weight distribution which has a short chain branch of a certain length, but no long chain branch. The linear low density polyethylene film has, in addition to the characteristics of a typical polyethylene film, a high breaking strength and elongation, and exhibits excellent tear strength and falling weight impact strength. The use of the linear low density polyethylene film increases in the stretch film, overlapping film or the like which is difficult to apply to a low density polyethylene or a high density polyethylene.

However, the linear low density polyethylene using 1-butene or 1-hexene as a comonomer is mostly prepared in a single gas phase reactor or a single loop slurry reactor, and the productivity is high as compared to a process using 1-octene comonomer, but these products are also limited in the catalyst technology and process technology. Thus, they are problematic in that their physical properties are greatly inferior to when using 1-octene comonomer and the molecular weight distribution is narrow and thus processability is poor.

Many studies are conducted to improve these problems, and U.S. Pat. No. 4,935,474 discloses a process for producing polyethylenes having a broad molecular weight distribution using two or more metallocene compounds. U.S. Pat. No. 6,828,394 discloses a process for producing polyethylenes having an excellent processability and particularly suitable for the film. In addition, U.S. Pat. No. 6,841,631 and U.S. Pat. No. 6,894,128 disclose that polyethylenes having a bimodal or multimodal molecular weight distribution is prepared using a metallocene catalyst comprising at least two metal compounds and thus it can be used for the application of a film, a blow molding, a pipe and the like. However, although the processability of these products was improved, there are still problems that the dispersion state per molecular weight within the unit particle is not uniform and thus the extruded appearance is rough even under a relatively good extrusion condition, and the physical property is not stable.

Given the above circumstances, the preparation of superior products, having a balance between the physical property and the processability is continuously required, and improvement for this is further required.

DETAILED DESCRIPTION OF THE INVENTION

Technical Problem

In order to solve the above-mentioned problems encountered with the prior arts, an object of the present invention is to provide a supported hybrid catalyst capable of preparing an olefin-based polymer having an excellent processability and an improved mechanical physical property, and a process for preparing an olefin-based polymer using the same.

Technical Solution

In order to achieve the above object, the present invention provides a supported hybrid catalyst comprising: i) a first catalyst represented by the following Chemical Formula 1; and ii) one or more catalysts selected from the group consisting of a second catalyst represented by the following Chemical Formula 2 and a third catalyst represented by the following Chemical Formula 3:

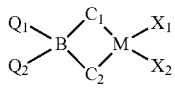

[Chemical Formula 1]

in the above Formula 1,

M is a Group 4 transition metal;

B is carbon, silicon, or germanium;

$Q_1$ and $Q_2$ are each independently hydrogen, halogen, $C_{1-20}$ alkyl, $C_{2-20}$ alkenyl, $C_{6-20}$ aryl, $C_{7-20}$ alkylaryl, $C_{7-20}$ arylalkyl, $C_{1-20}$ alkoxy, $C_{2-20}$ alkoxyalkyl, $C_{3-20}$ heterocycloalkyl, or $C_{5-20}$ heteroaryl; with the proviso that at least one of $Q_1$ and $Q_2$ is $C_{2-20}$ alkoxyalkyl;

$X_1$ and $X_2$ are each independently halogen, $C_{1-20}$ alkyl, $C_{2-20}$ alkenyl, $C_{6-20}$ aryl, nitro, amido, $C_{1-20}$ alkyl silyl, $C_{1-20}$ alkoxy, or $C_{1-20}$ sulfonate;

$C_1$ is the following Chemical Formula 2a, $C_2$ is the following Chemical Formula 2a or the following Chemical Formula 2b:

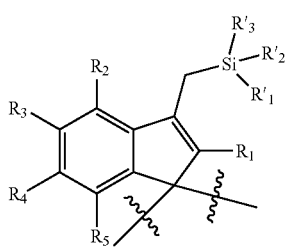

[Chemical Formula 2a]

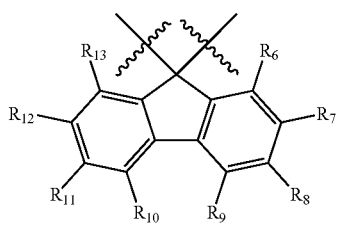

[Chemical Formula 2b]

in the above Formulas 2a and 2b, $R_1$ to $R_{13}$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silyl ether, $C_{1-20}$ alkoxy, $C_{6-20}$ aryl, $C_{7-20}$ alkylaryl, or $C_{7-20}$ arylalkyl, $R'_1$ to $R'_3$ are each independently hydrogen, halogen, $C_{1-20}$ alkyl, $C_{2-20}$ alkenyl, or $C_{6-20}$ aryl,

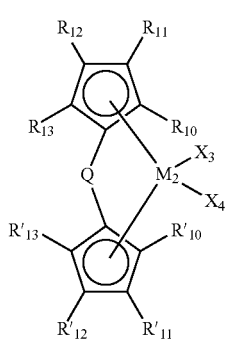

[Chemical Formula 2]

in the above Formula 2, $R_{10}$ to $R_{13}$ and $R'_{10}$ to $R'_{13}$ are each independently hydrogen, $C_{1-20}$ alkyl, $C_{2-20}$ alkenyl, $C_{6-20}$ aryl, $C_{7-20}$ alkylaryl, $C_{7-20}$ arylalkyl, $C_{7-20}$ alkoxyalkyl, or $C_{1-20}$ amine, or adjacent two or more of $R_{10}$ to $R_{13}$ and $R'_{10}$ to $R'_{13}$ are connected to each other to form at least one aliphatic, aromatic, or heterocyclic ring, wherein the aliphatic, aromatic, or heterocyclic ring is unsubstituted or substituted with $C_{1-20}$ alkyl;

Q is —$CH_2CH_2$—, —$C(Z_1)(Z_2)$—, or —$Si(Z_1)(Z_2)$—;

$Z_1$ and $Z_2$ are each independently hydrogen, $C_{1-20}$ alkyl, $C_{3-20}$ cycloalkyl, $C_{1-20}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, or $C_{7-40}$ arylalkyl;

$M_2$ is a Group 4 transition metal;

$X_3$ and $X_4$ are each independently halogen, $C_{1-20}$ alkyl, $C_{1-20}$ alkenyl, $C_{6-20}$ aryl, nitro, amido, $C_{1-20}$ alkylsilyl, $C_{1-20}$ alkoxy, or $C_{1-20}$ sulfonate;

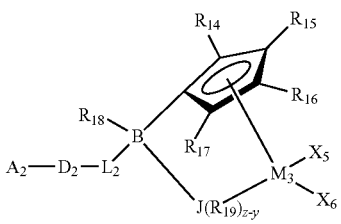

[Chemical Formula 3]

in the above Formula 3, $M_3$ is a Group 4 transition metal;

$X_5$ and $X_6$ are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;

$R_{14}$ to $R_{19}$ are each independently hydrogen, $C_{1-20}$ alkyl, $C_{2-20}$ alkenyl, $C_{1-20}$ alkoxy, $C_{6-20}$ aryl, $C_{7-20}$ alkylaryl, $C_{7-20}$ arylalkyl, $C_{1-20}$ alkylsilyl, $C_{6-20}$ arylsilyl, or $C_{1-20}$ amine; or adjacent two or more of $R_{14}$ to $R_{17}$ are connected to each other to form at least one aliphatic, aromatic, or heterocyclic ring;

$L_2$ is $C_{1-10}$ linear or branched alkylene;

$D_2$ is —O—, —S—, —N(R)—, or —Si(R)(R')—, wherein R and R' are each independently hydrogen, halogen, $C_{1-20}$ alkyl, $C_{2-20}$ alkenyl, or $C_{6-20}$ aryl;

$A_2$ is hydrogen, halogen, $C_{1-20}$ alkyl, $C_{2-20}$ alkenyl, $C_{6-20}$ aryl, $C_{7-20}$ alkylaryl, $C_{7-20}$ arylalkyl, $C_{1-20}$ alkoxy, $C_{2-20}$ alkoxyalkyl, $C_{2-20}$ heterocycloalkyl alkyl, or $C_{6-20}$ heteroaryl;

B is carbon, silicon, or germanium, and is a bridge which binds to cyclopentadienyl-based ligand and $J(R_{19})_{z-y}$ by a covalent bonb;

J is a Group 15 element or a Group 16 atom of the Periodic Table;

z is the oxidation number of the element J; and y is the number of bond of the element J.

The first catalyst represented by Chemical Formula 1 is characterized in that silyl group is substituted particularly with $C_1$ (Chemical Formula 2a). Also, indene derivatives of $C_1$ (Chemical Formula 2a) have a relatively low electron density compared to indenoindole derivatives or fluorenyl derivatives and includes a silyl group with a large steric hindrance. Therefore, due to a steric hindrance effect and electron density, the olefin polymer with a relatively low molecular weight can be polymerized in high activity as compared with the metallocene compound having a similar structure. Moreover, the fluorenyl derivatives which can be represented as in $C_2$ (Chemical Formula 2b) form a structure which is crosslinked by a bridge and have an unshared electron pair which can act as a Lewis base to the structure of the ligand, thereby exhibiting a high polymerization activity.

Preferably, in Chemical Formula 1, M is zirconium, B is silicon, $Q_1$ and $Q_2$ are each independently a $C_{1-20}$ alkyl or $C_{2-20}$ alkoxyalkyl, with the proviso that at least one of $Q_1$ and $Q_2$ is $C_{2-20}$ alkoxyalkyl (preferably, $C_{1-6}$ alkyl substituted with butoxy), and $X_1$ and $X_2$ are halogen. More preferably, $Q_1$ is methyl, and $Q_2$ is 6-tert-butoxy-hexyl.

Further, preferably, in Chemical Formulas 2a and 2b, $R_1$ to $R_{13}$ are hydrogen and $R'_1$ to $R'_3$ are $C_{1-20}$ alkyl. More preferably, $R'_1$ to $R'_3$ are methyl.

The method for preparing the first catalyst will be specifically explained by way of examples which will be described later.

In the supported hybrid catalyst, the first catalyst represented by Chemical Formula 1 may mainly contribute to make a copolymer having a high molecular weight and the catalyst represented by Chemical Formula 2 or Chemical Formula 3 may contribute to make a copolymer having a relatively low molecular weight.

Preferably, in Chemical Formula 2, $R_{10}$ to $R_{13}$ and $R'_{10}$ to $R'_{13}$ are each independently hydrogen, $C_{1-20}$ alkyl or $C_{2-20}$ alkoxyalkyl, or adjacent two or more of $R_{10}$ to $R_{13}$ and $R'_{10}$ to $R'_{13}$ are connected to each other to form at least one aliphatic or aromatic ring, wherein the aliphatic or aromatic ring is unsubstituted or substituted with by $C_{1-20}$ alkyl;

Q is —$CH_2CH_2$—, —$C(Z_1)(Z_2)$—, or —$Si(Z_1)(Z_2)$—;

$Z_1$ and $Z_2$ are each independently $C_{1-20}$ alkyl, or $C_{2-20}$ alkoxyalkyl;

$M_2$ is zirconium; and $X_3$ and X4 are halogen.

More preferably, in Chemical Formula 2, $R_{10}$ to $R_{13}$ and $R'_{10}$ to $R'_{13}$ are each independently hydrogen, methyl, or 6-tert-butoxy-hexyl, or adjacent two or more of $R_{10}$ to $R_{13}$ and $R'_{10}$ to $R'_{13}$ are connected to each other to form at least one benzene ring or cyclohexane ring, wherein the benzene ring is unsubstituted or substituted with tert-butoxy;

Q is —$CH_2CH_2$—, —$C(Z_1)(Z_2)$—, or —$Si(Z_1)(Z_2)$—;

$Z_1$ and $Z_2$ are each independently methyl, or 6-tert-butoxy-hexyl;

$M_2$ is zirconium; and $X_3$ and $X_4$ is chloro.

The method for preparing the second catalyst will be specifically explained by way of examples which will be described later.

The third catalyst represented by Chemical formula 3 may contribute to make a copolymer having approximately middle molecular weight of the first catalyst and the second catalyst.

Preferably, in Chemical Formula 3, $M_3$ is titanium;

$X_5$ and $X_6$ are halogen;

$R_{14}$ to $R_{19}$ are $C_{1-20}$ alkyl;

$L_2$ is $C_{1-10}$ linear or branched alkylene;

$D_2$ is —O—;

$A_2$ is $C_{1-20}$ alkyl;

B is silicone;

J is nitrogen;

z is the oxidation number of the element J;

y is the number of bond of the element J.

The method for preparing the third catalyst will be specifically explained by way of examples which will be described later.

As the support in the supported hybrid catalyst according to the present invention, a support containing hydroxyl groups on the surface can be used, and preferably a support having a hydroxy group and a siloxane group, on which the surface is dried and removed of moisture can be used.

For example, silica, silica-alumina, silica-magnesia or the like that are dried at high temperature can be used, and these may typically contain oxides, carbonates, sulfates and nitrates, such as $Na_2O$, $K_2CO_3$, $BaSO_4$, and $Mg(NO_3)_2$ or the like.

In the supported hybrid catalyst according to the present invention, the weight ratio of the catalyst to the support is preferably in the range of 1:1 to 1:1000. When containing the carrier and the catalyst within the range of the above weight ratio, it may exhibit a proper activity of the supported catalyst and it may be advantageous in terms of the activity maintenance and economy of the catalyst.

Further, the weight ratio of i) the first catalyst represented by Chemical Formula 1 and ii) one or more catalysts selected from the group consisting of the second catalyst represented by Chemical Formula 2 and the third catalyst represented by Chemical Formula 3 is preferably in the range of 1:100 to 100:1. The optimum catalytic activity is shown within the range of the above weight ratio and thus it may be advantageous in terms of the activity maintenance and economy of the catalyst.

In addition to the above catalyst, a cocatalyst can be further used to produce an olefin polymer. As the cocatalyst, one or more of the cocatalyst compounds represented by the following Chemical Formula 4, Chemical Formula 5 or Chemical Formula 6 can be further included.

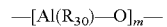　　　　　　　　　　　[Chemical Formula 4]

in the above Formula 4, $R_{30}$ may be same as or different from each other, and are each independently halogen; hydrocarbon having 1 to 20 carbon atoms; or halogen-substituted hydrocarbons having 1 to 20 carbon atoms;

m is an integer of 2 or more,

　　　　　　　　　　　[Chemical Formula 5]

in the above Formula 5, $R_{31}$ is as defined in Formula 4;

J is aluminum or boron;

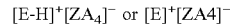　　　　　　　　　　　[Chemical Formula 6]

in the above Formula 6,

E is neutral or cationic Lewis base;

H is hydrogen atom;

Z is a Group 13 element; and

A may be same or different from each other, and is each independently aryl group having 6 to 20 carbon atoms or alkyl group having 1 to 20 carbon atoms, in which one or more hydrogen atoms are substituted or unsubstituted with halogen, hydrocarbon having 1 to 20 carbon atoms, alkoxy or phenoxy.

Examples of the compound represented by Chemical Formula 4 include methyl aluminoxane, ethyl aluminoxane, isobutyl aluminoxane, butyl aluminoxane and the like, and a more preferred compound is methylaluminoxane.

Examples of the compound represented by Chemical Formula 5 include trimethylaluminum, triethylaluminum, triisobutyl aluminum, tripropyl aluminum, tributyl aluminum, dimethylchloro aluminum, triisopropyl aluminum, tris-butyl aluminum, tricyclopentyl aluminum, tripentyl aluminum, triisopentyl aluminum, trihexyl aluminum, trioctyl aluminum, ethyldimethyl aluminum, methyl diethyl aluminum, triphenyl aluminum, tri-p-tolyl aluminum, dimethyl aluminum methoxide, dimethyl aluminum ethoxide, trimethyl boron, triethyl boron, triisobutyl boron, tripropyl boron, tributyl boron and the like, and a more preferred compound is selected among trimethylaluminum, triethylaluminum and triisobutylaluminum.

Examples of the compound represented by Chemical Formula 6 include triethylammonium tetraphenyl boron, tributylammonium tetraphenyl boron, trimethylammonium tetraphenyl boron, tripropylammonium tetraphenyl boron, trimethylammonium tetra(p-tolyl)boron, trimethyl ammonium tetra(o,p-dimethylphenyl)boron, tributylammonium tetra(p-trifluoromethylphenyl)boron, trimethyl ammonium tetra(p-trifluoromethylphenyl)boron, tributylammonium tetrapentafluorophenyl boron, N,N-diethylanilinium tetraphenyl boron, N,N-diethylanilinium tetrapentafluorophenyl boron, diethylamonium tetrapentafluorophenyl boron, triphenylphosphonium tetraphenyl boron, trimethyl phosphonium tetraphenyl boron, triethylammonium tetraphenyl aluminum, tributylammonium tetraphenylaluminum, trimethylammonium tetraphenyl aluminum, tripropylammonium tetraphenylaluminum, trimethyl ammonium tetra(p-tolyl)aluminum, tripropyl ammonium tetra(p-tolyl)aluminum, triethylammonium tetra(o,p-dimethylphenyl) aluminum, tributylammonium tetra(p-trifluoromethylphenyl)aluminum, trimethylammonium tetra (p-trifluoromethylphenyl)aluminum, tributylammonium tetrapentafluorophenylaluminum, N,N-diethylanilinium tetraphenyl aluminum, N,N-diethylanilinium tetrapentafluoro phenylaluminum, diethylammonium tetrapentaphenylaluminum, triphenylphosphonium tetraphenylaluminum, trimethyl phosphonium tetraphenyl aluminum, tripropylammoniumtetra(p-tolyl)boron, triethylammonium tetra(o,p-dimethylphenyl)boron, tributylammonium tetra(p-trifluoromethylphenyl)boron, triphenylcarbonium tetra(p-trifluoromethylphenyl)boron, tetraphenylcarbonium tetrapentafluorophenyl boron and the like.

The supported hybrid catalyst according to the present invention can be prepared by the steps of supporting a cocatalyst compound on a support, supporting a first catalyst on the support, and supporting a second catalyst and/or a third catalyst on the support, and the order of supporting the catalysts may be varied as required.

As a reaction solvent in the production of the supported hybrid catalyst, hydrocarbon solvents such as pentane, hexane or heptane and aromatic solvents such as benzene or toluene can be used. Further, the metallocene compound and the cocatalyst compound can be used in the form supported on silica or alumina.

In addition, the present invention provides a method for preparing an olefin-based polymer comprising the step of polymerizing olefin-based monomers in the presence of the above supported hybrid catalyst.

In the method for preparing an olefin-based polymer according to the present invention, specific examples of the olefin-based monomers include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-itocene or the like, and two or more of these monomers may be mixed to be copolymerized.

The olefin-based polymer is more preferably ehtylene/alphaolefinic copolymer, but it is not limited thereto.

When the olefin-based polymer is ehtylene/alphaolefinic copolymer, the content of the alphaolefin which is the comonomer is not particularly limited, and it can be properly selected depending on the use, object or the like of olefin-based polymers. More particularly, the content of the alphaolefin may be greater than 0 mol % and not greater than 99 mol %.

The polymerization reaction may be carried out by homopolymerizing one olefin-based monomer or by copolymerizing two or more monomers, using a continuous slurry polymerization reactor, a loop slurry reactor, a gas phase reactor or a solution reactor.

The supported hybrid catalyst can be injected by dissolving or diluting in aliphatic hydrocarbon solvent having 5 to 12 carbon atoms, such as pentane, hexane, heptane, nonane, decane and isomers thereof, an aromatic hydrocarbon solvent such as toluene and benzene, or a hydrocarbon solvent substituted by a chlorine atom, such as dichloromethane and chlorobenzene. The solvent used herein is preferably treated with a small amount of alkyl aluminum to remove a small amount of water or air and the like which act as a catalyst poison, and a cocatalyst can be further used.

Advantageous Effects

As described above, the supported hybrid catalyst according to the present invention can be used in the preparation of an olefin-based polymer having a high molecular weight and a broad molecular weight distribution. Therefore, the olefin-based polymer prepared using the supported hybrid catalyst has excellent processability and mechanical properties and thus can be effectively used for the application of films or the like.

DETAILED DESCRIPTION OF THE EMBODIMENTS

Hereinafter, the preferred Examples are provided for better understanding. However, these Examples are for illustrative purposes only and the invention are not intended to be limited by these Examples.

I. Preparation of the First Catalyst

Preparation Example 1-1 (PRECURSOR A)

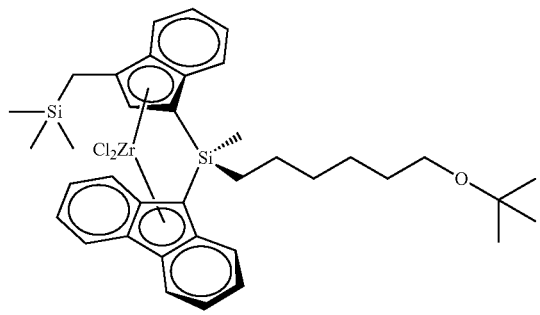

Step 1) Preparation of a Ligand Compound 1.66 g (10 mmol) of fluorene was injected into a dried 250 mL Schlenk flask (first flask) and made in a state of argon to which 50 mL of ether was added under reduced pressure. After the mixture was cooled down to 0° C., the inside of the flask was replaced by argon to which 4.8 mL (12 mmol) of 2.5 M n-BuLi hexane solution was slowly added dropwise. After gradually raised to room temperature, the reaction mixture was stirred for one day. 40 mL of hexane was injected into another 250 mL Schlenk flask, to which 2.713 g (10 mmol) of (6-tert-butoxyhexyl)dichloro(methyl)silane was added. After cooled down to −78° C., the mixture prepared above was slowly added dropwise thereto. After gradually raising to room temperature, the mixture was stirred for 12 hours.

2.02 g (10 mmol) of ((1 H-inden-3-yl)methyl)trimethylsilane was injected into the other dried 250 mL Schlenk flask (second flask) to which 50 mL of THF was added and dissolved. The solution was cooled down to 0° C., to which 4.8 mL (12 mmol) of 2.5 M n-BuLi hexane solution was added dropwise, warmed up to room temperature, and then stirred for 12 hours.

The mixture of the first flask was cooled down to −78° C., to which a solution of the second flask was added dropwise and then gradually warmed up to room temperature, followed by stirring for 24 hours. 50 mL of water added thereto and the organic layer was extracted three times with ether (50 mL×3). To the collected organic layer, an appropriate amount of MgSO$_4$ was added, stirred for a while, filtered and the solvent was dried under reduced pressure. Thereby, 5.8 g (molecular weight: 566.96, 10.3 mmol, yield: 103%) of ligand compound in the form of a yellow oil was obtained. The obtained ligand compound was used in the preparation of metallocene compounds without further separation process.

$^1$H NMR (500 MHz, CDCl$_3$): 0.00, 0.26 (3H, d), 0.46 (9H, m), 0.67 (1H, m), 0.83 (1H, m), 1.01 (1H, m), 1.25 (2H, m), 1.42 (2H, m), 1.49 (2H, m), 1.60 (9H, m), 1.72 (2H, m), 2.41 (2H, m), 3.66 (2H, m), 3.70, 3.77 (1H, s), 4.52 (1H, m), 6.01, 6.26, 6.37 (1H, s), 7.50 (1H, m), 7.59-7.80 (7H, m), 7.81 (1H, q), 7.97 (1H, d), 8.29 (2H, m).

2) Preparation of a Metallocene Compound

The ligand compound synthesized in Step 1 was added to a 250 mL Schlenk flask dried in an oven, and then dissolved in 4 equivalents of methyl tert-butyl ether (MTBE) and 60 mL of toluene to which 2 equivalents of n-BuLi hexane solution was added. After a lapse of one day, all solvent in the inside of the flask was removed under a vacuum condition, and then dissolved in an equal amount of toluene. One equivalent of ZrCl$_4$(THF)$_2$ was taken in a glove box and injected into a 250 mL Schlenk flask to which toluene was added to prepare a suspension. The above two flasks all were cooled down to −78° C., and then the lithiated ligand compound was slowly added to a toluene suspension of ZrCl$_4$(THF)$_2$. After completion of the injection, the reaction mixture was gradually warmed up to room temperature, stirred for one day and subjected to reaction. Then, toluene in the mixture was removed up to a volume of about ⅕ through vacuum-reduced pressure. Hexane was added in about 5 times volume of the remaining toluene thereto and recrystallized. The mixture was filtered without contacting with the outside air to give a metallocene compound. In the upper portion of the filter the resulting filter cake was washed using a little hexane, and then weighed in the glove box to identify the synthesis, yield and purity. As a result, 4.05 g (5.56 mmol, 55.6%) of an orange solid was obtained (purity: 100%, molecular weight: 727.08).

$^1$H NMR (500 MHz, CDCl$_3$): −0.13 (9H, m), −0.13 (3H, m), 0.53 (2H, m), 0.87 (2H, m), 1.25 (9H, m), 1.29 (4H, m), 1.51 (2H, s), 1.64 (2H, m), 3.34 (2H, m), 5.26 (1H, s), 6.81 (1H, m), 7.07 (2H, m), 7.18 (1H, m), 7.38 (1H, m), 7.46-7.56 (4H, m), 7.72 (1H, q), 7.95 (1H, d), 8.03 (1H, d)

Preparation Example 1-2 (PRECURSOR B)

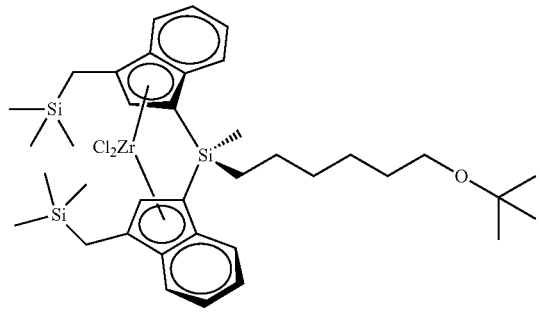

Step 1) Preparation of a Ligand Compound 4.05 g (20 mmol) of (1H-indene-3-yl)methyl)trimethylsilane was injected into a dried 250 mL Schlenk flask (first flask) and then dissolved in 40 mL of diethyl ether under an argon gas. After cooled down to 0° C., 9.6 mL (24 mmol) of 2.5 M n-BuLi hexane solution was slowly added dropwise thereto. After gradually warmed to room temperature, the reaction mixture was stirred for 24 hours. In another 250 mL Schlenk flask, 2.713 g (10 mmol) of (6-tert-butoxyhexyl) dichloro(methyl)silane was dissolved in 30 mL of hexane to prepare a solution. The solution was cooled down to −78° C. to which a mixture of the first flask was then slowly added dropwise. After added dropwise, the mixture was gradually warmed up to room temperature and stirred for 24 hours. 50 mL of water was added thereto, and the organic layer was extracted three times with ether (50 mL×3). To the collected organic layer, an appropriate amount of MgSO$_4$ was added, stirred for a while, filtered and then the solvent was dried under reduced pressure. Thereby, 6.1 g (molecular weight: 603.11, 10.05 mmol, 100.5% yield) of a ligand compound in the form of yellow oil was obtained. The resulting ligand compound was used in the preparation of the metallocene compound without further separation process.

$^1$H NMR (500 MHz, CDCl$_3$): 0.02 (18H, m), 0.82 (3H, m), 1.15 (3H, m), 1.17 (9H, m), 1.42 (H, m), 1.96 (2H, m), 2.02 (2H, m), 3.21 (2H, m), 3.31 (1H, s), 5.86 (1H, m), 6.10 (1H, m), 7.14 (3H, m), 7.14 (2H, m) 7.32 (3H, m)

Step 2) Preparation of a Metallocene Compound

The ligand compound synthesized in Step 1 was injected into a 250 mL Schlenk flask dried in an oven and dissolved in 4 equivalents of MTBE and 60 mL of toluene, and then 2 equivalents of n-BuLi hexane solution was added thereto. After a lapse of one day, all solvent in the inside of the flask was removed under a vacuum condition, and then dissolved in an equal amount of toluene. One equivalent of ZrCl$_4$ (THF)$_2$ was taken in a glove box and injected into a 250 mL Schlenk flask to which toluene was added to prepare a suspension. The above two flasks all were cooled down to −78° C., and then the lithiated ligand compound was slowly added to a toluene suspension of ZrCl$_4$(THF)$_2$. After completion of the injection, the reaction mixture was gradually warmed up to room temperature, stirred for one day and subjected to reaction. Then, toluene in the mixture was removed up to a volume of about ⅕ through vacuum reduced-pressure. Hexane was added in about 5 times volume of the remaining toluene thereto and recrystallized. The mixture was filtered without contacting with the outside air to give a metallocene compound. In the upper portion of the filter the resulting filter cake was washed using a little hexane, and then weighed in glove box to identify the synthesis, yield and purity. As a result, 7.3 g (9.56mmol, 95.6%) of a purple oil was obtained from 6.1 g (10 mmol) of the ligand compound and stored in a toluene solution (purity: 100%, molecular weight: 763.23).

$^1$H NMR (500 MHz, CDCl$_3$): 0.03 (18H, m), 0.98, 1.28 (3H, d), 1.40 (9H, m), 1.45 (4H, m), 1.66 (6H, m), 2.43 (4H, s), 3.47 (2H, m), 5.34 (1H, m), 5.56 (1H, m), 6.95 (1H, m), 6.97 (1H, m), 6.98(1H, m), 7.22 (1H, m), 7.36 (2H, m), 7.43 (1H, m), 7.57 (1H, m)

II. Preparation of the Second Catalyst

Preparation Example 2-1 (PRECURSOR C)

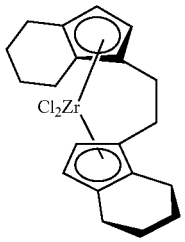

Metallocene catalyst having the above structural formula (CAS No. 100163-29-9) was purchased from Sigma-Aldrich Corporation.

Preparation Example 2-2 (PRECURSOR D)

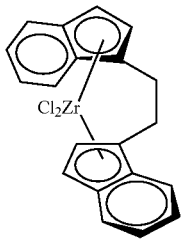

1,2-ethylene bis(indenyl) ZrCl$_2$ compound was synthesized as disclosed in J. AM. CHEM. SOC. VOL. 126, No. 46, 2004 pp. 15231-15244.

Preparation Example 2-3 (PRECURSOR E)

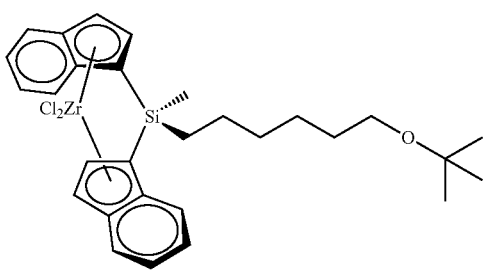

Step 1) Preparation of a Ligand Compound 2.323 g (20 mmol) of indene was injected into a dried 250 mL Schlenk flask 2.323 g (20 mmol) to which 40 mL of MTBE was added under an argon gas. The solution was cooled down to 0° C. to which 8 mL (20 mmol) of 2.5 M n-BuLi hexane solution was added dropwise. The mixture was gradually warmed up to room temperature and then stirred for 24 hours. In another 250 mL Schlenk flask, 2.713 g (10 mmol) of (6-tert-butoxyhexyl)dichloro(methyl)silane and 30 mL of hexane were injected and cooled down to −78° C., to which the mixture prepared above was added dropwise. The mixture was gradually warmed up to room temperature and stirred for 24 hours. 50 mL of water was added thereto and quenched, and the organic layer was separated and dried with MgSO$_4$. As a result, 3.882 g (9.013 mmol, 90%) of the product was obtained.

NMR standard purity (wt %)=100%, Mw =430.70

$^1$H NMR (500 MHz, CDCl$_3$): −0.45, −0.22, −0.07, 0.54 (total 3H, s), 0.87 (1H, m), 1.13 (9H, m), 1.16-1.46 (10H, m), 3.25 (2H, m), 3.57 (1H, m), 6.75, 6.85, 6.90, 7.11, 7.12, 7.19 (total 4H, m), 7.22-7.45 (4H, m), 7.48-7.51 (4H, m)

Step 2) Preparation of a Metallocene Compound

The ligand compound synthesized in Step 1 was injected into a 250 mL Schlenk flask dried in an oven, and then dissolved in 4 equivalents of methyl tert-butyl ether (MTBE) and 60 mL of toluene. 2.1 equivalents of n-BuLi hexane solution was added thereto, subjected to lithiation for 24 hours and then all solvent was removed through a vacuum-reduced pressure. In a hexane solvent, the reaction product was filtered with Schlenk filter to obtain only Li-salt (3.092 g, 6.987 mmol). In order to obtain a more pure catalyst precursor, purification was carried out. 2.1 equivalents of ZrCl$_4$(THF)$_2$ was taken in a glove box and injected into a 250 mL Schlenk flask to which toluene was added to prepare a suspension. The above two flasks all were cooled down to −78° C., and then the lithiated ligand compound was slowly added to a toluene suspension of ZrCl$_4$(THF)$_2$. The reaction mixture was gradually warmed up to room temperature and stirred for one day. Then, toluene in the mixture was removed through vacuum-reduced pressure. Hexane of volume equivalent to the previous solvent was added thereto and recrystallized. Hexane slurry prepared was filtered under argon, and both the filtered solid and the filtrate were subjected to vacuum-reduced pressure to evaporate a solvent. The remaining filter cake and filtrate were identified through NMR, respectively, and then weighed in glove box to identify the yield and purity.

From 3.1 g (6.987 mmol) of the ligand compound, 1.321 g (2.806 mmol, 40.2%) of yellow oil was obtained and stored in a toluene solution (0.3371 mmol/mg).

NMR standard purity (wt %)=100%, Mw: 605.85

$^1$H NMR (500 MHz, CDCl$_3$): 0.88 (3H, m), 1.15 (9H, m), 1.17-1.47 (10H, m), 1.53 (4H, d), 1.63 (3H, m), 1.81 (1H, m), 6.12 (2H, m), 7.15 (2H, m), 7.22-7.59 (8H, m)

Preparation Example 2-4 (PRECURSOR F)

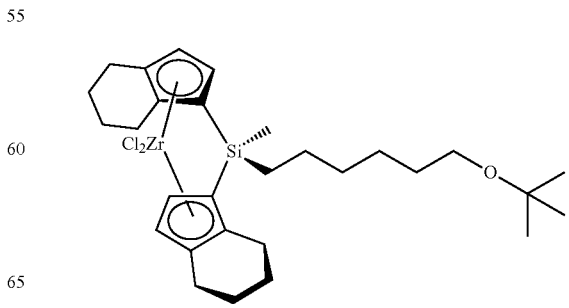

The catalyst prepared in Preparative Example 2-3 and PtO₂ (0.023 g, 0.1 mmol) was injected into a 599 mL high pressure reactor under an argon atmosphere of glove box to which 30 mL of methylene chloride was added. The reactor was assembled and and removed in the glove box. Hydrogen gas was charged with a high pressure reactor up to 40 bar and then stirred at 60° C. for 12 hours. After cooled down to room temperature, a celite dried in a filter frit was charged with the reactor and filtered. The solvent of the filtrate was removed under vacuum to obtain 0.39 g of a product as a yellow gum.

¹H NMR (500 MHz, CDCl₃): 0.72 (3H, s), 1.17 (9H, t), 1.96-1.25 (20H, m), 2.87-2.32 (8H, m), 3.33 (2H, t), 5.48 (2H, d), 6.64 (2H, d)

Preparation Example 2-5 (PRECURSOR G)

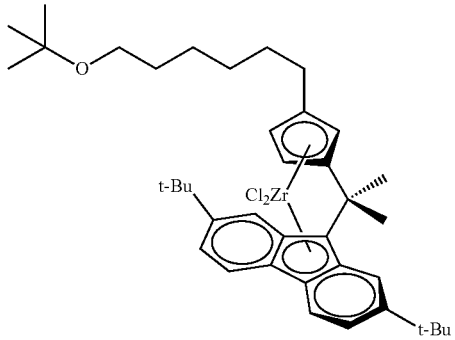

Step 1) Preparation of a Ligand Compound 5.25 g (23.6 mmol) of 2-(6-tert-butoxyhexyl)cyclopenta-1,3-diene was injected into a dried 250 mL Schlenk flask to which 50 mL of methanol and 4 mL of acetone were added, followed by cooling down to 0° C. 2.95 mL (1.5 eq) of pyrrolidine was added dropwise thereto, gradually warmed up to room temperature and then stirred for 7 hours. 50 mL of water was added thereto and subjected to quenching, and the organic layer was separated and dried with MgSO₄. As a result, it was identified by NMR that 5.0 g (19.07 mmol, 80.7%) of 2-(6-tert-butoxyhexyl)-5-(propaan-2-ylidene)cyclopenta-1,3-diene was produced, and the product was dissolved in ether.

In another 250 mL Schlenk flask, 2.784 g (10 mmol) of 2,7-di-tert-butyl-9H-fluorene was injected and made in a state of argon, to which 50 mL of ether was added under reduced pressure and dissolved. The solution was cooled down to 0° C., to which 4.8 mL (12 mmol) of 2.5 M n-BuLi hexane solution was added dropwise, warmed up to room temperature and then stirred for one day. The solution was added to ether solution of the previously prepared 2-(6-tert-butoxy-cyclohexyl)-5-(propane-2-ylidene)cyclopenta-1,3-diene and then stirred for one day. 50 mL of water was added thereto and subjected to quenching, and the organic layer was separated, dried with MgSO₄ and filtered to give a pure solution. In the solution, all solvent was removed under vacuum-reduced pressure to obtain 5.0 g (9.36 mmol, 93.6%) of oil.

NMR standard purity (wt %)=100%, Mw=540.86

¹H NMR (500 MHz, CDCl₃): 0.87 (1H, m), 0.99 (6H, m), 1.19 (9H, s), 1.30 (11H, s), 1.41 (11, s), 1.51-1.67 (5H, m), 3.00, 3.13 (1H, s), 3.35 (2H, m), 3.87, 4.05, 4.09, 4.11 (1H, s), 5.72, 5.97, 6.14, 6.61 (3H, s), 7.28 (1H, m), 7.35 (1H, m), 7.42 (1H, m), 7.58 (2H, m), 7.69 (2H, d)

Step 2) Preparation of a Metallocene Compound

The ligand compound synthesized in Step 1 was injected into a 250 mL Schlenk flask dried in an oven, and then dissolved in 4 equivalents of methyl tert-butyl ether (MTBE) and toluene. 2.1 equivalents of n-BuLi hexane solution was added thereto, followed by lithiation for 24 hours. 2.1 equivalents of ZrCl₄(THF)₂ was taken in a glove box and injected into a 250 mL Schlenk flask to which ether was added to prepare a suspension. The above two flasks all were cooled down to −78° C., and then the lithiated ligand compound was slowly added to a suspension of ZrCl₄(THF)₂. The reaction mixture was gradually warmed to room temperature and stirred for one day. Then, ether in the mixture was removed up to the volume of about ⅕ through vacuum-reduced pressure, to which hexane was added in 5 times volume of the remaining solution and recrystallized. The resulting hexane slurry was filtered under an argon atmosphere, and both the filtered solid and the filtrate was subjected to vacuum-reduced pressure to evaporate a solvent. The remaining filter cake and filtrate were identified through NMR, respectively, and then weighed in the glove box to identify the yield and purity. From 5.1 g (9.4 mmol) of the ligand compound, 4.4 g (6.3 mmol, 67.4%) of a brown solid was obtained.

NMR standard purity (wt %)=100%, Mw: 700.98

¹H NMR (500 MHz, CDCl₃): 1.17 (9H, s), 1.23-1.26 (6H, m), 1.27 (12H, s), 1.38 (6H, s), 1.40-1.44 (4H, m), 2.33 (3H, s), 2.36 (3H, s), 3.33 (2H, t), 5.31 (1H, m), 5.54 (1H, m), 5.95 (1H, m), 7.39 (1H, m), 7.58 (2H, m), 7.62 (1H, m), 7.70 (1H, s), 8.00 (1H, t)

Preparation Example 2-6 (PRECURSOR H)

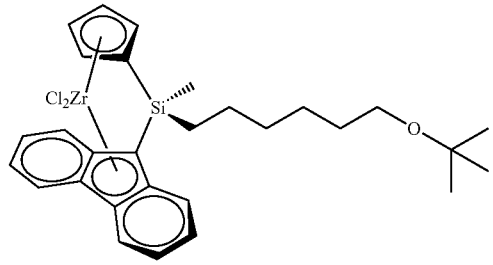

Step 1) Preparation of a Ligand 100 g (0.60 mol) of fluorene, 4.5 L of hexane and 35.7 mL (0.3 mol) of MTBE were injected into a reactor at −30° C. to which one equivalent of n-BuLi (2.5 M in hexane) was slowly added, stirred at room temperature for 6 hours and then further stirred at 40° C. for 3 hours or more. After completion of the stirring, the reactor temperature was cooled down to −30° C. The resulting fluorenyl lithium solution was slowly added dropwise to 162.8 g (0.6 mol) of (6-tert-butoxyhexyl)dichloro(methyl) solution dissolved in hexane (3 L) at −30° C. over one hour. After stirring at room temperature for 8 hours or more, the reaction mixture was again cooled down to −30° C. and then reacted with C₅H₅Na (55.9 g, 0.6 mol)/THF(4 L) solution for 6 hours or more. All volatile materials were removed by a vacuum drying and extracted with hexane to give a yellow oily compound as a final ligand (yield: 99%, ligand overall yield: 91%).

The structure of the ligand was identified by NMR.

¹H NMR (400 MHz, CDCl₃): −0.13, 0.06 (MeSi, 3H, s), 0.27, 0.35 (Si—CH₂, 2H, m), 1.19 (tert-BuO, 9H, s), 1.15-

1.40 (CH$_2$, 4H, m), 1.41-1.55 (CH$_2$, 4H, m), 2.70, 3.10 (methylene CpH, 2H, brs), 3.31 (tert-BuO—CH$_2$, 2H, t), 4.01 (methylene Flu-H, 1H, s), 6.00-6.30, 6.40-6.70 (CpH, 4H, m), 7.26-7.50 (Flu-H, 3H, m), 7.51 (Flu-H, 1H, d), 7.58 (Flu-H, 1H, d), 7.80 (Flu-H, 1H, d), 7.90 (Flu-H, 2H, d)

Step 2) Preparation of a Metallocene Compound 2 equivalents of n-BuLi (2.5 M in hexane) was slowly added to a solution of the ligand (310.1 g, 0.72 mol) prepared in Step 1/toluene (3.0 L) at −30° C. and then reacted for 8 hours or more while gradually warmed up to room temperature. Then, the slurry solution of ZrCl$_4$(THF)$_2$ (271.7 g, 0.72 mol)/toluene (2.5 L) was slowly added to the dilithium salt slurry solution prepared above and further reacted at room temperature for 8 hours. All volatile materials were dried under vacuum. To the resulting oily liquid material was added dichloromethane solvent and filtered. The filtered solution was dried under vacuum to which hexane was added to lead to a precipitate. The resulting precipitate was washed several times with hexane to give a desired compound as a red solid (70% yield).

$^1$H NMR (400MHz, C$_6$D$_6$): 0.66 (MeSi, 3H, s), 1.16 (tert-BuO, 9H, s), 1.35 (Si—CH$_2$, 2H, m), 1.40-1.75 (CH$_2$, 8H, m), 2.70, 3.30 (tert-BuO—CH$_2$, 2H, t), 5.46 (CpH, 2H, br d), 6.46 (CpH, 2H, br s), 7.05-7.20 (Flu-H, 2H, m), 7.34 (Flu-H, 1H, d), 7.39 (Flu-H, 1H, d), 7.46 (Flu-H, 2H, t), 7.89 (Flu-H, 2H, d)

Preparation Example 2-7 (PRECURSOR I)

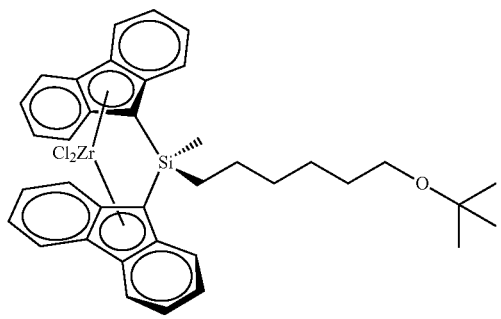

Step 1) Preparation of a Ligand Compound

Fluorene (3.33 g, 20 mmol), hexane (100 mL) and MTBE (1.2 mL, 10 mmol) were injected into a reactor at −20° C. to which 8 mL of n-BuLi (2.5 M in hexane) was slowly added, followed by stirring at room temperature for 6 hours. After completion of the stirring, the reactor temperature was cooled down to −30° C., the above prepared fluorenyl lithium solution was slowly added to a solution of (6-tert-butoxyhexyl)dichloro(methyl)silane (2.7 g, 10 mmol) dissolved in hexane (100 mL) at −30° C. over one hour. The reaction mixture was stirred at room temperature for 8 hours to which water was added, extracted and then dried (evaporated) to give a ligand compound (5.3 g, 100% yield). The structure of the ligand was identified by NMR.

$^1$H NMR (500 MHz, CDCl$_3$): −0.35 (MeSi, 3H, s), 0.26 (Si—CH$_2$, 2H, m), 0.58 (CH$_2$, 2H, m), 0.95 (CH$_2$, 4H, m), 1.17 (tert-BuO, 9H, s), 1.29 (CH$_2$, 2H, m), 3.21 (tert-BuO—CH$_2$, 2H, t), 4.10 (Flu-9H, 2H, s), 7.25 (Flu-H, 4H, m), 7.35 (Flu-H, 4H, m), 7.40 (Flu-H, 4H, m), 7.85 (Flu-H, 4H, d).

Step 2) Preparation of a Metallocene Compound 4.8 mL of n-BuLi (2.5 M in hexane) was slowly added to a solution of the ligand (3.18 g, 6 mmol) prepared in Step 1/MTBE(20 mL) at −20° C., and then reacted for 8 hours or more while gradually warmed to room temperature. Then, the slurry solution of dilithium salts previously prepared was slowly added to a slurry solution of ZrCl$_4$(THF)$_2$ (2.26 g, 6 mmol)/hexane (20 mL) at −20° C. and further reacted at room temperature for 8 hours. The precipitate was filtered, washed several times with hexane to give a desired compound as a red solid (4.3 g, 94.5% yield).

$^1$H NMR (500MHz, C$_6$D$_6$): 1.15 (tert-BuO, 9H, s), 1.26 (MeSi, 3H, s), 1.58 (Si—CH$_2$, 2H, m), 1.66 (CH$_2$, 4H, m), 1.91 (CH$_2$, 4H, m), 3.32 (tert-BuO—CH$_2$, 2H, t), 6.86 (Flu-H, 2H, t), 6.90 (Flu-H, 2H, t), 7.15 (Flu-H, 4H, m), 7.60 (Flu-H, 4H, dd), 7.64 (Flu-H, 2H, d), 7.77 (Flu-H, 2H, d)

Preparation Example 2-8 (PRECURSOR J)

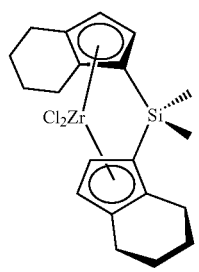

Metallocene catalyst having the above structural formula (CAS No. 126642-97-5) was purchased from ALFA Chemistry Corporation.

Preparation Example 2-9 (PRECURSOR K)

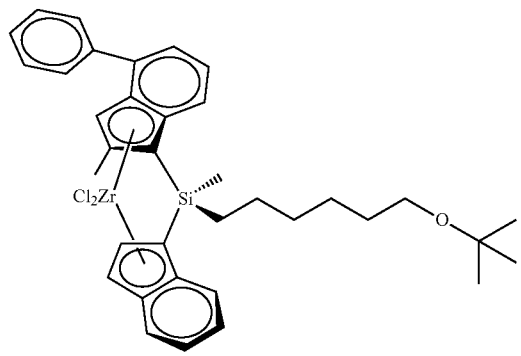

Step 1) Preparation of a Ligand Compound 1.162 g (10 mmol) of indene was added to a dried 250 mL Schlenk flask (first flask) under an argon atmosphere, and then dissolved in a co-solvent of 5 mL of ether and 40 mL of hexane 40 mL. The solution was cooled down to 0° C. to which 4.8 mL (12 mmol) of 2.5 M n-BuLi hexane solution was added dropwise. The mixture was gradually warmed up to room temperature and then stirred for one day. To another 250 mL Schlenk flask (second flask), 2.713 g (10 mmol) of (6-tert-butoxyhexyl)dichloro(methyl)silane and 100 mL of hexane were added and cooled down to −78° C. to which the mixture prepared above was added dropwise.

To the other dried 250 mL Schlenk flask (third flask), 2.063 g (10 mmol) of 2-methyl-4-phenyl-indene was added and then dissolved in 40 mL of ether. The solution was cooled to 0° C. to which 4.8 mL (12 mmol) of 2.5 M n-BuLi hexane solution was added dropwise. The mixture was gradually warmed up to room temperature and then stirred for one day. 0.1 mol % of copper cyanide was added dropwise and then stirred for one hour. The mixture was placed in the previous second flask and then stirred for one day. 50 mL of water was added thereto, subjected to quenching and worked-up with ether. The organic layer was separated and dried with MgSO$_4$. As a result, 5.53 g (10.61 mmol, 106.1%) of a product was obtained as a brown oil.

NMR standard purity (wt %)=100%, Mw: 520.82

$^1$H NMR (500 MHz, CDCl$_3$): −0.44, −0.36, −0.28, −0.19, 0.09-0.031 (total 3H, m), 0.84 (1H, m), 1.09 (9H, s), 1.23-1.47 (10H, m), 2.14 (3H, s), 3.25 (2H, m), 3.45 (2H, m), 6.38, 6.53, 6.88, 6.92 (total 2H, m), 6.93 (1H, m), 7.11-7.24 (2H, m), 7.28-7.32 (3H, m), 7.35 (2H, m), 7.44 (3H, m), 7.53 (2H, m)

Step 2) Preparation of a Metallocene Compound

The ligand compound synthesized in Step 1 was added a 250 mL Schlenk flask dried in an oven and dissolved in 4 equivalents of MTBE and toluene, to which 2.1 equivalents of n-BuLi solution was added and subjected to lithiation for 24 hours. 2.1 equivalents of ZrCl$_4$(THF)$_2$ was taken in a glove box and injected into a 250 mL Schlenk flask to which ether was added to prepare a suspension. Two flasks all were cooled down to −78° C., and then lithiated ligand compound was slowly added to a suspension of ZrCl$_4$(THF)$_2$. The mixture was gradually warmed up to room temperature and stirred for one day, and then subjected to vacuum-reduced pressure. The toluene solution was filtered under an argon atmosphere to remove LiCl which was the filtered solid filter cake. The filtrate was subjected to vacuum-reduced pressure to remove toluene, to which pantane equivalent to the previous solvent was added and recrystallized. The prepared pentane slurry was filtered under an argon atmosphere and subjected to a vacuum-reduced pressure to evaporate a solvent. The remaining filtrate and filter cake were identified through NMR and weighted in the glove box to identify the yield and purity. As a result, 3.15 g (4.63 mmol, 46.3%) of a filter cake was obtained as an orange solid.

NMR standard purity (wt %)=100%, Mw: 680.93

$^1$H NMR (500 MHz, CDCl$_3$): 0.01 (3H, s), 0.89 (3H, m), 1.19 (9H, s), 1.26-1.33 (6H, m), 1.50 (4H, m), 2.06, 2.15, 2.36 (total 3H, m), 3.35 (2H, m), 3.66 (1H, s), 6.11-6.99 (3H, s), 7.13-7.17 (2H, m), 7.36-7.68 (10H, m)

III. Preparation of the Third Catalyst

Preparation Example 3 (PRECURSOR L)

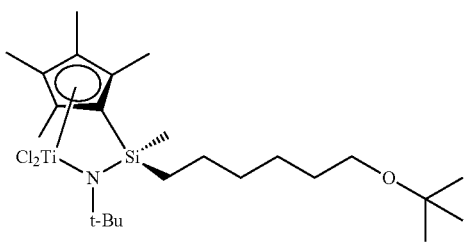

150 g (1.2 mol) of tetramethylcyclopentadiene and 2.4 L of THF were injected into a reactor, and the reactor temperature was cooled down to −20° C. 480 mL of n-BuLi was added to the reactor at a rate of 5 mL/min using a feeding pump. The reaction mixture was stirred for 12 hours while gradually raising the reactor temperature to room temperature. 326 g (350 mL, 1 eq.) of (6-tert-butoxyhexyl)dichloro(methyl)silane was rapidly added to the reactor. The reaction mixture was stirred for 12 hours while gradually raising the reactor temperature to room temperature. Then, the reactor temperature was again cooled down to 0° C. to which 2 equivalents of t-BuNH$_2$ was added. The mixture was stirred for 12 hours while gradually warmed to room temperature. This solution was removed of THF to which 4 L of hexane was added and then subjected to a lapdori machine to give a salt-free filtrate. The filtrate was again added to the reactor, and removed of hexane at 70° C. to remain a yellowish solution. This solution was analyzed through NMR to identify metyl(6-t-buthoxyhexyl)(tetramethylCpH)t-butylaminosilane compound as the desired product. n-BuLi was added at −78° C. and then TiCl$_3$(THF)$_3$ (10 mmol) was rapidly added. The reaction solution was stirred for 12 hours while gradually warmed up to room temperature. One equivalent (10 mmol) of PbCl$_2$ was added to the solution at room temperature and then stirred for further 12 hours to give a bluish dark black solution. The reaction solution thus obtained was removed of THF, mixed with hexane and then filtered out. The resulting solution was removed of hexane to give a product.

$^1$H NMR (CDCl$_3$): 0.7 (3H, s), 1.2 (9H, s), 1.4 (9H, s), 0.8-1.8 (8H, m), 2.1 (6H, s), 2.2 (s, 6H), 3.3 (4H, s)

IV. Preparation of a Supported Hybrid Catalyst

Example 1

100 mL of toluene was added to a 350 mL autoclave glass reactor to which 10 g of silica (Grace Davison, SP2410) was added, followed by stirring while gradually warmed up to 40° C. 30 mL of 30 wt % methyl aluminoxane(MAO)/toluene solution (Albemarle Corporation) was added to the reactor, heated to 70° C. and then stirred at 200 rpm for 12 hours. The reaction was cooled down to 40° C. and the stirring was stopped. Settling was carried out for 10 minutes and the reaction solution was subjected to decantation. 100 mL of toluene was added to the reactor and stirred for 10 minutes, and then the stirring was stopped. Settling was carried out for 10 minutes and the toluene solution was subjected to decantation. 50 mL of toluene was added to the reactor to which 0.30 g of the compound obtained in Preparation Example 1-1 and 30 mL of toluene were added and stirred at 200 rpm for 90 minutes. After stopping the stirring, settling was carried out for 10 minutes and the reaction solution was subjected to decantation. 50 mL of toluene was added to the reactor to which 0.20 g of the compound obtained in Preparation Example 2-3 and 20 mL of toluene were added and then stirred at 200 rpm for 90 minutes. The reactor temperature was cooled down to room temperature and the stirring was stopped. Settling was carried out for 10 minutes and the reaction solution was subjected to decantation. 100 mL of hexane was added to the reactor, and hexane slurry was transferred to a 250 mL Schlenk flask, and the hexane solution was subjected to decantation. The resulting solution was dried at room temperature under reduced pressure for 3 hours to prepare 15.0 g of a supported catalyst.

Example 2

15.5 g of a supported catalyst was prepared in the same manner as described in Example 1, except that 0.15 g of the compound obtained in Preparation Example 2-1 was used instead of the compound obtained in Preparation Example 2-3.

Example 3

15.0 g of a supported catalyst was prepared in the same manner as described in Example 1, except that 0.13 g of the compound obtained in Preparation Example 2-5 was used instead of the compound obtained in Preparation Example 2-3.

Example 4

15.5 g of a supported catalyst was prepared in the same manner as described in Example 1, except that 0.20 g of the compound obtained in Preparation Example 1-2 was used instead of the compound obtained in Preparation Example 1-1, and 0.30 g of the compound obtained in Preparation Example 2-4 was used instead of the compound obtained in Preparation Example 2-3.

Example 5

16.5 g of a supported catalyst was prepared in the same manner as described in Example 4, except that 0.30 g of the compound obtained in Preparation Example 2-1 was used instead of the compound obtained in Preparation Example 2-4.

Example 6

16.1 g of a supported catalyst was prepared in the same manner as described in Example 4, except that 0.25 g of the compound obtained in Preparation Example 2-2 was used instead of the compound obtained in Preparation Example 2-3.

Example 7

16.1 g of a supported catalyst was prepared in the same manner as described in Example 4, except that 0.13 g of the compound obtained in Preparation Example 2-6 was used instead of the compound obtained in Preparation Example 2-3.

Example 8

14.9 g of a supported catalyst was prepared in the same manner as described in Example 4, except that 0.20 g of the compound obtained in Preparation Example 2-7 was used instead of the compound obtained in Preparation Example 2-3.

Example 9

15.4 g of a supported catalyst was prepared in the same manner as described in Example 1, except that 0.22 g of the compound obtained in Preparation Example 1-2 was used instead of the compound obtained in Preparation Example 1-1 and 0.30 g of the compound obtained in Preparation Example 2-3 was used instead of the compound obtained in Preparation Example 2-3.

Example 10

16.7 g of a supported catalyst was prepared in the same manner as described in Example 9, except that 0.20 g of the compound obtained in Preparation Example 2-8 was used instead of the compound obtained in Preparation Example 2-3.

Example 11

16.7 g of a supported catalyst was prepared in the same manner as described in Example 9, except that 0.32 g of the compound obtained in Preparation Example 2-9 was used instead of the compound obtained in Preparation Example 2-3.

Example 12

100 mL of toluene was added to a 350 mL autoclave glass reactor to which 10 g of silica (Grace Davison, SP2410) was added, followed by stirring while gradually warmed up to 40° C. 30 mL of 30 wt % methyl aluminoxane(MAO) itoluene solution (Albemarle Corporation) was injected into the reactor, heated to 70° C. and then stirred at 200 rpm for 12 hours. The reaction was cooled down to 40° C. and the stirring was stopped. Settling was carried out for 10 minutes and the reaction solution was subjected to decantation. 100 mL of toluene was injected into the reactor and stirred for 10 minutes, and then the stirring was stopped. Settling was carried out for 10 minutes, and toluent solution was subjected to decantation. 50 mL of toluene was injected into the reactor and the reactor temperature was warmed up to 60° C. 0.18 g of the compound obtained in Preparation Example 3 was added to the reactor and then stirred at 200 rpm for 90 minutes. 0.18 g of the compound obtained in Preparation Example 1-2 and 0.20 g of the compound obtained in Preparation Example 2-1 were injected into a 250 mL Schlenk flask, to which 50 mL of toluene was added. The solution in the flask was injected into the reactor and stirred at 200 rpm for 90 minutes. The reactor temperature was cooled down to room temperature and the stirring was stopped. Settling was carried out for 10 minutes and the reaction solution was subjected to decantation. 100 mL of hexane was injected into the reactor and hexane slurry was transferred to a 250 mL Schlenk flask. The hexane solution was subjected to decantion. The resulting solution was dried at room temperature under reduced pressure for 3 hours to prepare 16.4 g of a supported catalyst.

Example 13

16.1 g of a supported catalyst was prepared in the same manner as described in Example 12, except that 0.21 g of the compound obtained in Preparation Example 2-4 was used instead of the compound obtained in Preparation Example 2-1.

Example 14

15.1 g of a supported catalyst was prepared in the same manner as described in Example 12, except that 0.15 g of the compound obtained in Preparation Example 2-7 was used instead of the compound obtained in Preparation Example 2-1.

Example 15

16.3 g of a supported catalyst was prepared in the same manner as described in Example 12, except that 0.10 g of the compound obtained in Preparation Example 2-5 was used instead of the compound obtained in Preparation Example 3.

Example 16

16.0 g of a supported catalyst was prepared in the same manner as described in Example 12, except that 0.13 g of the compound obtained in Preparation Example 2-3 was used instead of the compound obtained in Preparation Example 3.

Example 17

15.4 g of a supported catalyst was prepared in the same manner as described in Example 12, except that 0.17 g of the compound obtained in Preparation Example 2-2 was used instead of the compound obtained in Preparation Example 3.

Example 18

100 mL of toluene was injected into a 350 mL autoclave glass reactor to which la g of silica (Grace Davison, SP2410) was added, followed by stirring while raising the temperature to 40° C. 25 mL of 30 wt % methyl aluminoxane (MAO)/toluene solution (Albemarle Corporation) was injected into the reactor, heated to 60° C. and then stirred at 200 rpm for 12 hours. The reaction was cooled down to 40° C. and the stirring was stopped. Settling was carried out for 10 minutes and the reaction solution was subjected to decantation. 100 mL of toluene was injected into the reactor and stirred for 10 minutes, and then the stirring was stopped. Settling was carried out for 10 minutes, and toluent solution was subjected to decantation. 50 mL of toluene was injected into the reactor and the reactor temperature was warmed up to 40° C. 0.30 g of the compound obtained in Preparation Example 1-2, 0.20 g of the compound obtained in Preparation Example 2-4 and 0.15 g of the compound obtained in Preparation Example 2-6 were injected into a 250 mL Schlenk flask, to which 70 mL of toluene was added. The solution in the flask was injected into the reactor and stirred at 200 rpm for 90 minutes. The reactor temperature was cooled down to room temperature and the stirring was stopped. Settling was carried out for 10 minutes and the reaction solution was subjected to decantation. 10 mL of hexane was injected into the reactor and hexane slurry was transferred to a 250 mL Schlenk flask. The hexane solution was subjected to decantion. The resulting solution was dried at room temperature under reduced pressure for 3 hours to prepare 15.7 g of a supported catalyst.

Comparative Example 1

100 mL of toluene was injected into a 350 mL autoclave glass reactor to which 10 g of silica (Grace Davison, SP2410) was added, followed by stirring while raising the temperature to 40° C. 30 mL of 30 wt % methyl aluminoxane(MAO)/toluene solution (Albemarle Corporation) was injected into the reactor, heated to 70° C. and then stirred at 200 rpm for 12 hours. The reaction was cooled down to 40° C. and the stirring was stopped. Settling was carried out for 10 minutes and the reaction solution was subjected to decantation. 100 mL of toluene was injected into the reactor, stirred for 10 minutes and then the stirring was stopped. Settling was carried out for 10 minutes, and toluent solution was subjected to decantation. 50 mL of toluene was injected into the reactor and 0.30 g of the compound obtained in Preparation Example 2-6 and 30 mL of toluene were added and then stirred at 200 rpm for 90 minutes. After stopping the stirring, settling was carried out for 10 minutes and the reaction solution was subjected to decantation. 30 mL of toluene was injected into the reactor to which 0.15 g of the compound obtained in Preparation Example 2-1 and 10 mL of toluene were added and then stirred at 200 rpm for 90 minutes. The reactor temperature was cooled down to room temperature and the stirring was stopped. Settling was carried out for 10 minutes and the reaction solution was subjected to decantation. 10 mL of hexane was injected into the reactor and hexane slurry was transferred to a 250 mL Schlenk flask. The hexane solution was subjected to decantion. The resulting solution was dried at room temperature under reduced pressure for 3 hours to prepare 15.8 g of a supported catalyst.

Comparative Example 2

15.8 g of a supported catalyst was prepared in the same manner as described in Comparative Example 1, except that 0.30 g of the compound obtained in Preparation Example 2-3 was used instead of the compound obtained in Preparation Example 2-6, and 0.10 g of the compound obtained in Preparation Example 2-3 was used instead of the compound obtained in Preparation Example 2-1.

Comparative Example 3

15.9 g of a supported catalyst was prepared in the same manner as described in Comparative Example 2, except that 0.11 g of the compound obtained in Preparation Example 2-4 was used instead of the compound obtained in Preparation Example 2-3.

V. Polymerization Experiment 2 mL of Teal (1M in hexane) and 80 g of 1-hexene were injected into a 2 L autoclave high pressure reactor to which 0.6 kg of hexene was added and then heated to 70° C. with stirring at 500 rpm. Each of the supported catalysts prepared in Examples 1 to 18 and Comparative Examples 1 to 3 were placed with hexane in a vial, and injected into the reactor and further 0.2 kg of hexane was added. When the internal temperature of the reactor was 70° C., the solution was reacted for 1 hour with stirring at 500 rpm under ethylene pressure of 30 bar. After completion of the reaction, the resulting polymer was filtered and primarily removed of hexane, and then dried in oven at 80° C. for 3 hours. The polymerization results are shown in Tables 1 and 2 below. In addition, for comparison, LUCENE™ SP330 and LUCENE™ SP310 available from LG Chem, which were commercial mLLDPE prepared by a slurry loop polymerization process, are shown together.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Amount of catalyst (mg) | 50.1 | 50.0 | 50.3 | 29.0 | 30.4 | 32.0 | 21.2 | 22.2 | 23.6 |

TABLE 1-continued

|  | Example 1 | Example 2 | Example 3 | Example 4 | Example 5 | Example 6 | Example 7 | Example 8 | Example 9 |
|---|---|---|---|---|---|---|---|---|---|
| Activity (gPE/gCat) | 2200 | 2100 | 2750 | 3220 | 3130 | 2910 | 3740 | 3620 | 4020 |
| Polymerization time (min) | 60 | 60 | 40 | 40 | 60 | 60 | 50 | 50 | 45 |
| H2 Injection amount (mol %) | 0.12 | 0.12 | 0.12 | 0.08 | 0.08 | 0.03 | 0.08 | 0.14 | 0.08 |
| MFRR (10/2.16) | 8.5 | 9.2 | 8.5 | 9.5 | 9.9 | 10.5 | 8.7 | 10.0 | 9.6 |
| Tm (° C.) | 120.3 | 122.0 | 121.8 | 120.8 | 122.1 | 122.5 | 121.4 | 121.6 | 120.0 |
| Mw (×10$^4$) | 10.0 | 10.6 | 9.8 | 15.5 | 14.8 | 15.4 | 10.1 | 0.5 | 10.1 |
| Mw/Mn | 4.1 | 4.5 | 4.0 | 3.8 | 3.8 | 4.0 | 4.0 | 4.5 | 3.9 |

TABLE 2

|  | Example 10 | Example 11 | Example 12 | Example 13 | Example 14 | Example 15 | Example 16 | Example 17 | Example 18 |
|---|---|---|---|---|---|---|---|---|---|
| Amount of catalyst (mg) | 48.1 | 33.0 | 30.9 | 30.7 | 29.1 | 22.0 | 23.6 | 31.0 | 19.8 |
| Activity (gPE/gCat) | 2600 | 3320 | 2540 | 2400 | 2780 | 3320 | 3740 | 3010 | 3800 |
| Polymerization time (min) | 60 | 60 | 60 | 60 | 60 | 60 | 45 | 50 | 40 |
| H2 Injection amount (mol %) | 0.08 | 0.08 | 0.12 | 0.14 | 0.16 | 0.08 | 0.04 | 0.06 | 0.10 |
| MFRR (10/2.16) | 8.4 | 8.9 | 10.9 | 10.1 | 9.8 | 10.0 | 11.1 | 10.0 | 11.1 |
| Tm (° C.) | 120.5 | 121.0 | 118.8 | 116.0 | 118.9 | 121.0 | 123.2 | 124.0 | 120.1 |
| Mw (×10$^4$) | 9.8 | 9.9 | 15.2 | 14.7 | 13.8 | 14.0 | 15.1 | 5.3 | 14.8 |
| Mw/Mn | 2.8 | 3.5 | 3.9 | 3.8 | 4.2 | 3.0 | 3.8 | 3.6 | 4.1 |

TABLE 3

|  | Comparative Example 1 | Comparative Example 2 | Comparative Example 3 | LUCENE™ SP330 | LUCENE™ SP310 |
|---|---|---|---|---|---|
| Amount of catalyst (mg) | 48.1 | 30.0 | 30.9 | — | — |
| Activity (gPE/gCat) | 2000 | 2320 | 1940 | — | — |
| Polymerization time (min) | 55 | 60 | 45 | — | — |
| H2 Injection amount (mol %) | 0.10 | 0.06 | 0.12 | — | — |
| MFRR(10/2.16) | 8.3 | 7.8 | 8.0 | 7.7 | 7.2 |
| Tm(° C.) | 120.5 | 121.0 | 120.0 | 123.0 | 117.0 |
| Mw(×10$^4$) | 11.5 | 12.1 | 15.2 | 13.0 | 11.1 |
| Mw/Mn | 2.8 | 3.5 | 3.9 | 2.8 | 2.8 |

The invention claimed is:

1. A supported hybrid catalyst comprising: i) a first catalyst represented by the following Chemical Formula 1; and ii) one or more catalysts selected from the group consisting of a second catalyst represented by the following Chemical Formula 2 and a third catalyst represented by the following Chemical Formula 3:

[Chemical Formula 1]

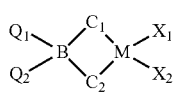

in the above Formula 1,
M is a Group 4 transition metal;
B is silicon;

$Q_1$ and $Q_2$ are each independently hydrogen, halogen, $C_{1-20}$ alkyl, $C_{2-20}$ alkenyl, $C_{6-20}$ aryl, $C_{7-20}$ alkylaryl, $C_{7-20}$ arylalkyl, $C_{1-20}$ alkoxy, $C_{2-20}$ alkoxyalkyl, $C_{3-20}$ heterocycloalkyl, or $C_{5-20}$ heteroaryl; with the proviso that at least one of $Q_1$ and $Q_2$ is $C_{2-20}$ alkoxyalkyl;

$X_1$ and $X_2$ are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;

$C_1$ is the following Chemical Formula 2a, $C_2$ is the following Chemical Formula 2a, or the following Chemical Formula 2b:

[Chemical Formula 2a]

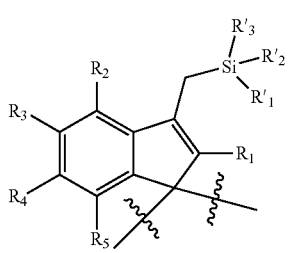

[Chemical Formula 2b]

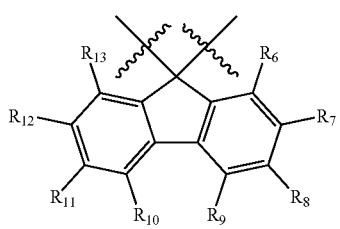

in the above Formulas 2a and 2b, $R_1$ to $R_{13}$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl, $R'_1$ to $R'_3$ are each independently hydrogen, halogen, $C_{1-20}$ alkyl, $C_{2-20}$ alkenyl, or $C_{6-20}$ aryl,

[Chemical Formula 2]

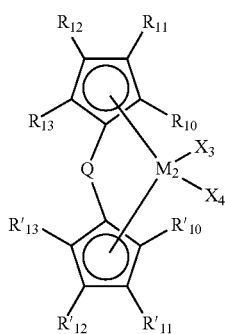

in the above Formula 2, $R_{10}$ to $R_{13}$ and $R'_{10}$ to $R'_{13}$ are each independently hydrogen, $C_{1-20}$ alkyl, $C_{2-20}$ alkenyl, $C_{6-20}$ aryl, $C_{7-20}$ alkylaryl, $C_{7-20}$ arylalkyl, $C_{7-20}$ alkoxyalkyl, or $C_{1-20}$ amine, or adjacent two or more of $R_{10}$ to $R_{13}$ and $R'_{10}$ to $R'_{13}$ are connected to each other to form at least one aliphatic, aromatic, or heterocyclic ring, wherein the aliphatic, aromatic, or heterocyclic ring is unsubstituted or substituted with $C_{1-20}$ alkyl;

Q is —Si($Z_1$)($Z_2$)—;

$Z_1$ and $Z_2$ are each independently hydrogen, $C_{1-20}$ alkyl, $C_{3-20}$ cycloalkyl, $C_{1-20}$ alkoxy, $C_{2-20}$ alkoxyalkyl, $C_{6-20}$ aryl, $C_{6-10}$ aryloxy, $C_{2-20}$ alkenyl, $C_{7-40}$ alkylaryl, or $C_{7-40}$ arylalkyl;

$M_2$ is a Group 4 transition metal;

$X_3$ and $X_4$ are each independently halogen, $C_{1-20}$ alkyl, $C_{1-20}$ alkenyl, $C_{6-20}$ aryl, nitro, amido, $C_{1-20}$ alkylsilyl, $C_{1-20}$ alkoxy, or $C_{1-20}$ sulfonate;

[Chemical Formula 3]

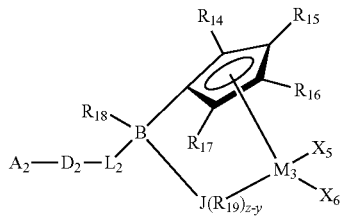

in the above Formula 3, $M_3$ is a Group 4 transition metal;

$X_5$ and $X_6$ are each independently halogen, $C_{1-20}$ alkyl, $C_{2-20}$ alkenyl, $C_{6-20}$ aryl, nitro, amido, $C_{1-20}$ alkylsilyl, $C_{1-20}$ alkoxy, or $C_{1-20}$ sulfonate;

$R_{14}$ to $R_{19}$ are each independently hydrogen, $C_{1-20}$ alkyl, $C_{2-20}$ alkenyl, $C_{1-20}$ alkoxy, $C_{6-20}$ aryl, $C_{7-20}$ alkylaryl, $C_{7-20}$ arylalkyl, $C_{1-20}$ alkylsilyl, $C_{6-20}$ arylsilyl, or $C_{1-20}$ amine; or adjacent two or more of $R_{14}$ to $R_{17}$ are connected to each other to form at least one aliphatic, aromatic, or heterocyclic ring;

$L_2$ is $C_{1-10}$ linear or branched alkylene;

$D_2$ is —O—;

$A_2$ is hydrogen, halogen, $C_{1-20}$ alkyl, $C_{2-20}$ alkenyl, $C_{6-20}$ aryl, $C_{7-20}$ alkylaryl, $C_{7-20}$ arylalkyl, $C_{1-20}$ alkoxy, $C_{2-20}$ alkoxyalkyl, $C_{2-20}$ heterocycloalkyl alkyl, or $C_{5-20}$ heteroaryl;

B is silicon and is a bridge which binds to cyclopentadienyl ligand and $J(R_{19})_{z-y}$ by a covalent bond;

J is a nitrogen atom;

z is 3; and y is 2.

2. The supported hybrid catalyst according to claim 1 wherein, in the Chemical Formula 1, M is zirconium, B is silicon, $Q_1$ and $Q_2$ are each independently $C_{1-20}$ alkyl, or $C_{2-20}$ alkoxyalkyl, with the proviso that at least one of $Q_1$ and $Q_2$ is $C_{2-20}$ alkoxyalky, and $X_1$ and $X_2$ are halogen.

3. The supported hybrid catalyst according to claim 2 wherein $Q_1$ is methyl, and $Q_2$ is 6-tert-butoxy-hexyl.

4. The supported hybrid catalyst according to claim 1 wherein, in Chemical Formulas 2a and 2b, $R_1$ to $R_{13}$ are hydrogen and $R'_1$ to $R'_3$ are $C_{1-20}$ alkyl.

5. The supported hybrid catalyst according to claim 4 wherein $R'_1$ to $R'_3$ are methyl.

6. The supported hybrid catalyst according to claim 1 wherein, in Chemical Formula 2, $R_{10}$ to $R_{13}$ and $R'_{10}$ to $R'_{13}$ are each independently hydrogen, $C_{1-20}$ alkyl, or $C_{2-20}$ alkoxyalkyl, or adjacent two or more of $R_{10}$ to $R_{13}$ and $R'_{10}$ to $R'_{13}$ are connected to each other to form at least one aliphatic or aromatic ring, wherein the aliphatic or aromatic ring is unsubstituted or substituted with by $C_{1-20}$ alkyl;

Q is $-Si(Z_1)(Z_2)-$;

$Z_1$ and $Z_2$ are each independently $C_{1-20}$ alkyl, or $C_{2-20}$ alkoxyalkyl;

$M_2$ is zirconium; and $X_3$ and $X_4$ are halogen.

7. The supported hybrid catalyst according to claim 6 wherein $R_{10}$ to $R_{13}$ and $R'_{10}$ to $R'_{13}$ are each independently hydrogen, methyl or 6-tert-butoxy-hexyl, or adjacent two or more of $R_{10}$ to $R_{13}$ and $R'_{10}$ to $R'_{13}$ are connected to each other to form at least one benzene ring or cyclohexane ring, wherein the benzene ring is unsubstituted or substituted with tert-butoxy;

Q is $-Si(Z_1)(Z_2)-$;

$Z_1$ and $Z_2$ are each independently methyl, or 6-tert-butoxy-hexyl;

$M_2$ is zirconium; and $X_3$ and $X_4$ is chloro.

8. The supported hybrid catalyst according to claim 1 wherein, in Chemical Formula 3, $M_3$ is titanium;

$X_5$ and $X_6$ are halogen;

$R_{14}$ to $R_{19}$ are $C_{1-20}$ alkyl, $L_2$ is $C_{1-10}$ linear or branched alkylene;

$D_2$ is $-O-$;

$A_2$ is $C_{1-20}$ alkyl;

B is silicone;

J is nitrogen;

z is the oxidation number of the element J; and y is the number of bond of the element J.

\* \* \* \* \*